(12) United States Patent
Ly et al.

(10) Patent No.: US 11,864,189 B2
(45) Date of Patent: Jan. 2, 2024

(54) MULTI-SLOT TRANSMISSIONS FOR MULTI-TRANSMISSION RECEPTION POINTS

(71) Applicant: QUALCOMM Incorporated, San Diego, CA (US)

(72) Inventors: Hung Dinh Ly, San Diego, CA (US); Gokul Sridharan, Sunnyvale, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 17/225,015

(22) Filed: Apr. 7, 2021

(65) Prior Publication Data

US 2022/0330308 A1 Oct. 13, 2022

(51) Int. Cl.
*H04W 52/14* (2009.01)
*H04W 72/23* (2023.01)
*H04W 72/0446* (2023.01)
*H04W 72/0453* (2023.01)
*H04W 72/50* (2023.01)

(52) U.S. Cl.
CPC ......... *H04W 72/23* (2023.01); *H04W 52/146* (2013.01); *H04W 72/0446* (2013.01); *H04W 72/0453* (2013.01); *H04W 72/535* (2023.01)

(58) Field of Classification Search
CPC ........... H04W 72/1289; H04W 52/146; H04W 72/1257
See application file for complete search history.

(56) References Cited

U.S. PATENT DOCUMENTS

| 2008/0316977 | A1 | 12/2008 | Malladi | |
|---|---|---|---|---|
| 2012/0314678 | A1* | 12/2012 | Ko | H04W 72/21 370/329 |
| 2017/0006578 | A1* | 1/2017 | Rico Alvarino | H04L 1/0038 |
| 2017/0201968 | A1* | 7/2017 | Nam | H04B 7/0632 |

(Continued)

FOREIGN PATENT DOCUMENTS

CA 3124598 A1 7/2020

OTHER PUBLICATIONS

International Search Report and Written Opinion—PCT/US2022/016017—ISA/EPO—dated May 18, 2022.

(Continued)

*Primary Examiner* — Brenda H Pham
(74) *Attorney, Agent, or Firm* — Shumaker & Sieffert, P. A.

(57) ABSTRACT

Certain aspects of the present disclosure provide techniques for multi-slot transport block transmission for multiple transmission reception points (multi-TRP). A method that may be performed by a user equipment (UE) includes receiving scheduling for at least one transport block to be transmitted across a plurality of slots. The method also includes transmitting a first portion of encoded bits associated with the at least one transport block across at least one of the plurality of slots with a first set of transmission parameters. The method further includes transmitting a second portion of the encoded bits associated with the at least one transport block across at least another one of the plurality of slots with a second set of transmission parameters.

18 Claims, 14 Drawing Sheets

(56) References Cited

U.S. PATENT DOCUMENTS

2019/0230656 A1* 7/2019 Soriaga ............ H04L 27/26025

OTHER PUBLICATIONS

Nokia, et al., "Transport Block Processing for PUSCH Coverage Enhancements", 3GPP Draft, R1-2101711, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021 (Jan. 18, 2021), XP051971864, 6 Pages, Retrieved from the Internet: URL: https://ftp.3gpp.org/tsg_ran/WG1_RL1/TSGR1_104-e/Docs/R1-2101711.zip R1-2101711 Transport block processing for PUSCH coverage enhancements. docx [retrieved on Jan. 18, 2021] Section 2 "Discussion", page first Section 2.2, p. fourth-p. fifth.

* cited by examiner

MULTI-SLOT TRANSMISSIONS FOR MULTI-TRANSMISSION RECEPTION POINTS

BACKGROUND

Field of the Disclosure

Aspects of the present disclosure relate to wireless communications, and more particularly, to techniques for implementing multi-slot transport block transmission for multiple transmission reception points (multi-TRP).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable coverage, reliability, and/or performance of wireless communications.

Certain aspects of the subject matter described in this disclosure can be implemented in a method for wireless communication by a user equipment (UE). The method generally includes receiving scheduling for at least one transport block to be transmitted across a plurality of slots. The method also includes transmitting a first portion of encoded bits associated with the at least one transport block across at least one of the plurality of slots with a first set of transmission parameters. The method further includes transmitting a second portion of the encoded bits associated with the at least one transport block across at least another one of the plurality of slots with a second set of transmission parameters.

Certain aspects of the subject matter described in this disclosure can be implemented in a method for wireless communication by a network entity. The method generally includes transmitting, to a UE, scheduling for at least one transport block across a plurality of slots. The method further includes receiving at least a portion of encoded bits associated with the at least one transport block across at least one of the plurality of slots transmitted with a first set of transmission parameters.

Certain aspects of the subject matter described in this disclosure can be implemented in an apparatus for wireless communication. The apparatus generally includes a transceiver configured to receive scheduling for at least one transport block to be transmitted across a plurality of slots; transmit a first portion of encoded bits associated with the at least one transport block across at least one of the plurality of slots with a first set of transmission parameters; and transmit a second portion of the encoded bits associated with the at least one transport block across at least another one of the plurality of slots with a second set of transmission parameters.

Certain aspects of the subject matter described in this disclosure can be implemented in an apparatus for wireless communication. The apparatus generally includes a transceiver configured to transmit, to a UE, scheduling for at least one transport block across a plurality of slots; and receive at least a portion of encoded bits associated with the at least one transport block across at least one of the plurality of slots transmitted with a first set of transmission parameters.

Certain aspects of the subject matter described in this disclosure can be implemented in an apparatus for wireless communication. The apparatus generally includes means for receiving scheduling for at least one transport block to be transmitted across a plurality of slots; means for transmitting a first portion of encoded bits associated with the at least one transport block across at least one of the plurality of slots with a first set of transmission parameters; and means for transmitting a second portion of the encoded bits associated with the at least one transport block across at least another one of the plurality of slots with a second set of transmission parameters.

Certain aspects of the subject matter described in this disclosure can be implemented in an apparatus for wireless communication. The apparatus generally includes means for transmitting, to a UE, scheduling for at least one transport block across a plurality of slots; and means for receiving at least a portion of encoded bits associated with the at least one transport block across at least one of the plurality of slots transmitted with a first set of transmission parameters.

Certain aspects of the subject matter described in this disclosure can be implemented in a computer-readable medium. The computer-readable medium has instructions stored thereon for receiving scheduling for at least one transport block to be transmitted across a plurality of slots; transmitting a first portion of encoded bits associated with the at least one transport block across at least one of the plurality of slots with a first set of transmission parameters;

and transmitting a second portion of the encoded bits associated with the at least one transport block across at least another one of the plurality of slots with a second set of transmission parameters.

Certain aspects of the subject matter described in this disclosure can be implemented in a computer-readable medium. The computer-readable medium has instructions stored thereon for transmitting, to a UE, scheduling for at least one transport block across a plurality of slots; and receiving at least a portion of encoded bits associated with the at least one transport block across at least one of the plurality of slots transmitted with a first set of transmission parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
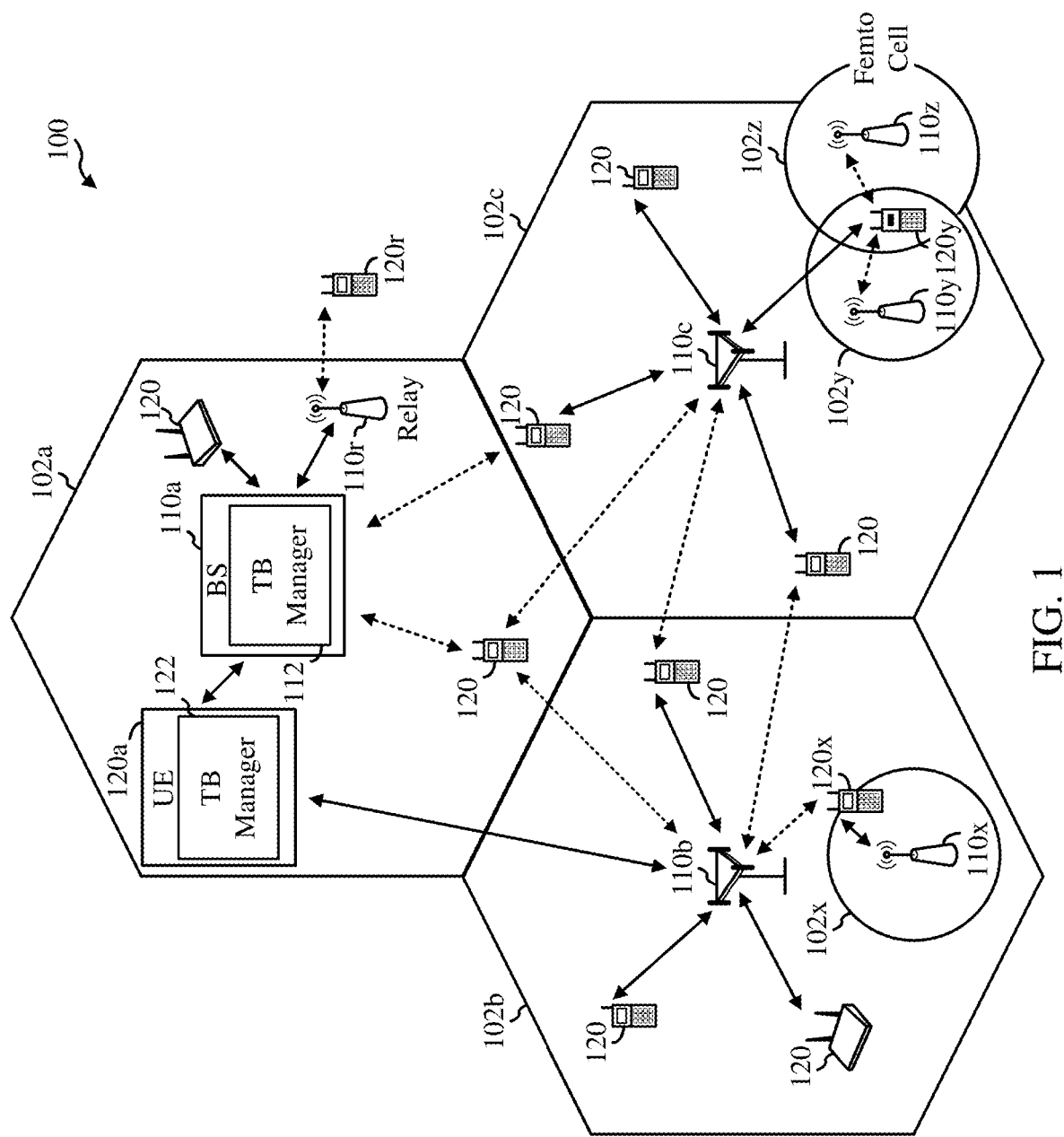
FIG. 1 is a block diagram conceptually illustrating an example wireless communication network, in accordance with certain aspects of the present disclosure.

Aspects of the present disclosure provide apparatus, methods, processing systems, and computer readable mediums for implementing multi-slot transport block (TB) transmissions over an uplink channel for multi-transmission reception point (multi-TRP) communications. The techniques for implementing multi-slot TB transmissions among multiple TRPs may provide how to schedule the multi-slot TB transmissions, how the resources for the multi-slot TB transmissions may be multiplexed in the frequency domain and/or time domain, how resources may be allocated for the multi-slot TB transmissions, and/or how RVs and/or RV sequences may be configured for the multi-slot TB transmissions. In certain aspects, a multi-slot TB transmission in multi-TRP communications may provide desirable coverage, reliability, and/or performance, for example, due to the reduced overhead for the multi-slot TBs and spatial diversity provided by the multiple TRPs.

The following description provides examples of multi-slot TB transmissions for multi-TRP in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

As shown in FIG. 1, the BS 110a includes a transport block (TB) manager 112 that may schedule a UE with multi-slot TB transmissions to separate TRPs (e.g., the BS 110a and BS 110b) and receives at least one of the multi-slot TB transmissions, in accordance with aspects of the present disclosure. The UE 120a includes a TB manager 122 that receives the scheduling for the multi-slot TB transmission to separate TRPs and transmits the multi-slot TBs, in accordance with aspects of the present disclosure.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
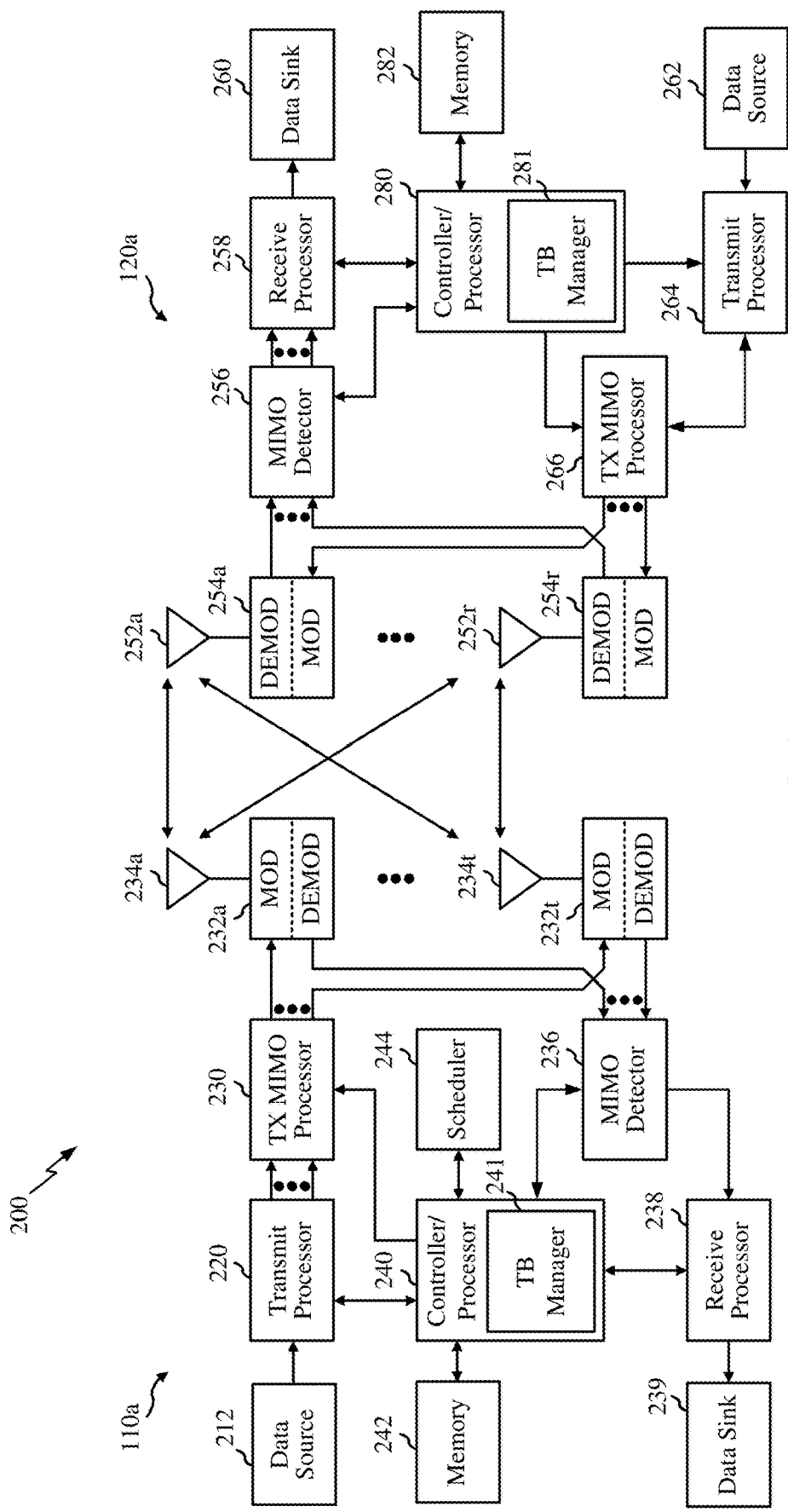
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a TB manager 241, which may be representative of the TB manager 112, according to aspects described herein. As shown in FIG. 2, the controller/processor 280 of the UE 120a has a TB manager 281, which may be representative of the TB manager 122, according to aspects described herein. Although shown at the controller/processor, other components of the UE 120a and BS 110a may be used to perform the operations described herein.

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some embodiments, the BS 110a illustrated in FIG. 2 and described above is an example of another UE 120.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
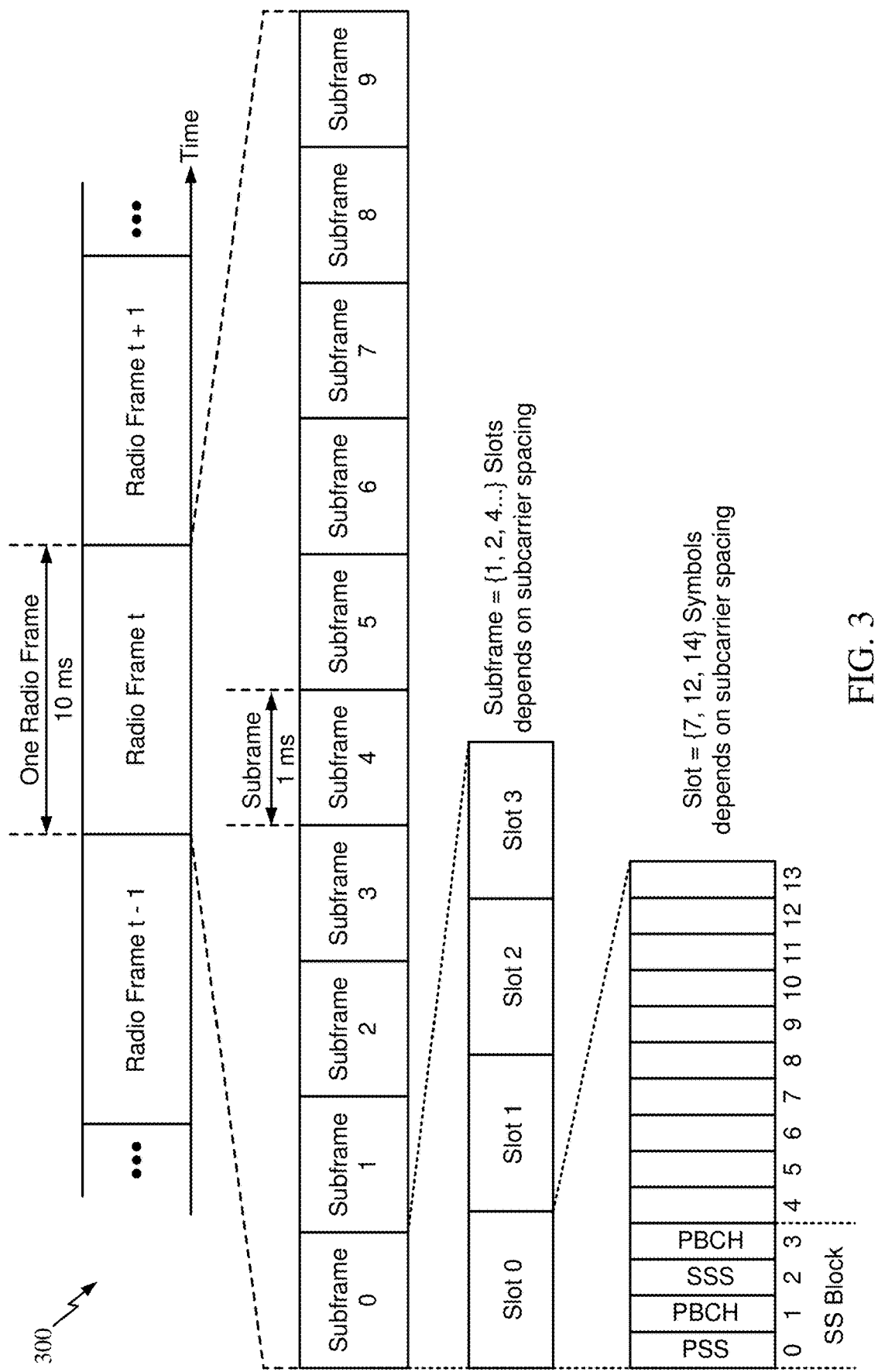
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., downlink (DL), uplink (UL), or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst periodicity, system frame number, etc. The SSBs may be organized into an SS burst to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times within an SS burst, for example, with up to sixty-four different beam directions for mmWave. The multiple transmissions of the SSB are referred to as an SS burst in a half radio frame. SSBs in an SS burst may be transmitted in the same frequency region, while SSBs in different SS bursts can be transmitted at different frequency regions.

Example Multi-Slot Transport Block Transmission

Figure 4A:
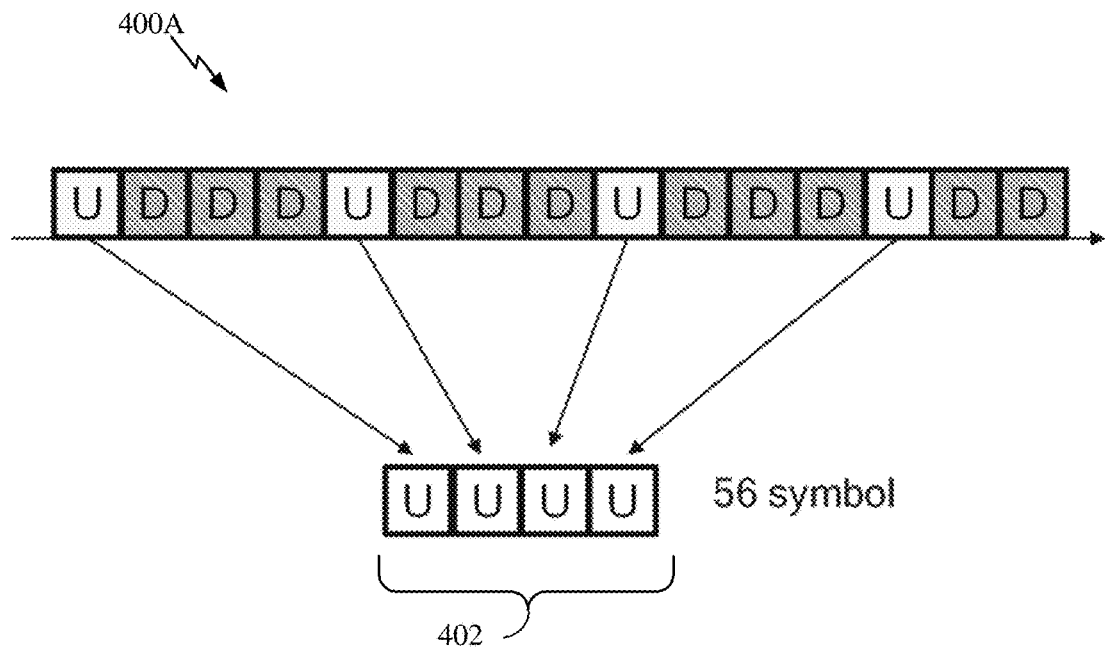
FIGS. 4A and 4B are diagrams illustrating examples of time-division duplex (TDD) schemes for downlink (DL) and uplink (UL) slots, in accordance with certain aspects of the present disclosure.
Figure 4B:
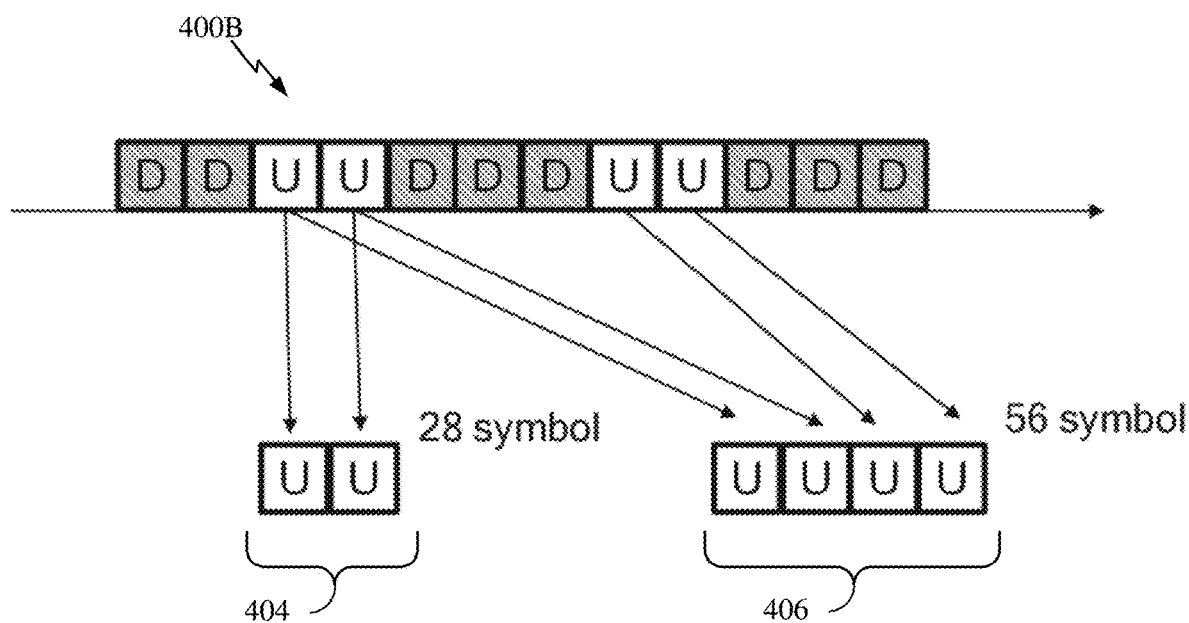

In certain wireless communication systems (e.g., NR), a transport block (TB) may span across multiple slots in the time domain. In other words, a TB may provide continuity of a data bit sequence across multiple slots. As used herein, such a TB may be referred to as a multi-slot TB transmission or a multi-slot TB. For example, FIGS. 4A and 4B illustrate examples of time-division duplex (TDD) schemes for downlink (DL) and uplink (UL) slots, in accordance with certain aspects of the present disclosure. Referring to FIG. 4A, an TDD UL-DL pattern 400A may have a periodic sequence of one UL slot followed by three DL slots. A multi-slot TB 402 may include four UL slots across the non-consecutive UL slots in the TDD UL-DL pattern 400A, and the multi-slot TB 402 may have a total of 56 symbols, for example. As shown in FIG. 4B, an TDD UL-DL pattern 400B may have a periodic sequence of two UL slots followed by three DL slots. In certain cases, a multi-slot TB 404 may include two consecutive UL slots having a total of 28 symbols. In certain aspects, a multi-slot TB 406 may include four UL slots with two pairs of consecutive UL slots having a total of 56 symbols. In other words, a multi-slot TB may include consecutive and/or non-consecutive UL slots. In certain cases, a multi-slot TB may span across multiple slots, but be less than or equal to a slot in length. The encoded payload of a TB may be transmitted based on a single redundancy version (RV). In certain cases, a TB transmission may be referred to as a transmission occasion. If repetitions are allowed, the transport block may be transmitted over multiple transmission occasions.

In general, a redundancy version (RV) in an RV sequence may span across consecutive slots (referred to as Option A) or non-consecutive slots (referred to as Option B) of a multi-slot TB. Under Option B, the UE may buffer the whole interleaved coded sequence and track the starting bit in each transmission occasion of the multi-slot TB. The RV sequence may provide the RVs used for each retransmission or repetition in a sequence of retransmissions. As an example, the RV sequence may have the following values: {0, 2, 3, 1}, {0, 3, 0, 3}, or {0, 0, 0, 0}, where each element in the sequence represents a specific RV. The RV sequence of {0, 2, 3, 1} provides that the first RV is RV0, the second RV is RV2, the third RV is RV3, and the last RV is RV1 in the sequence.

Figure 5:
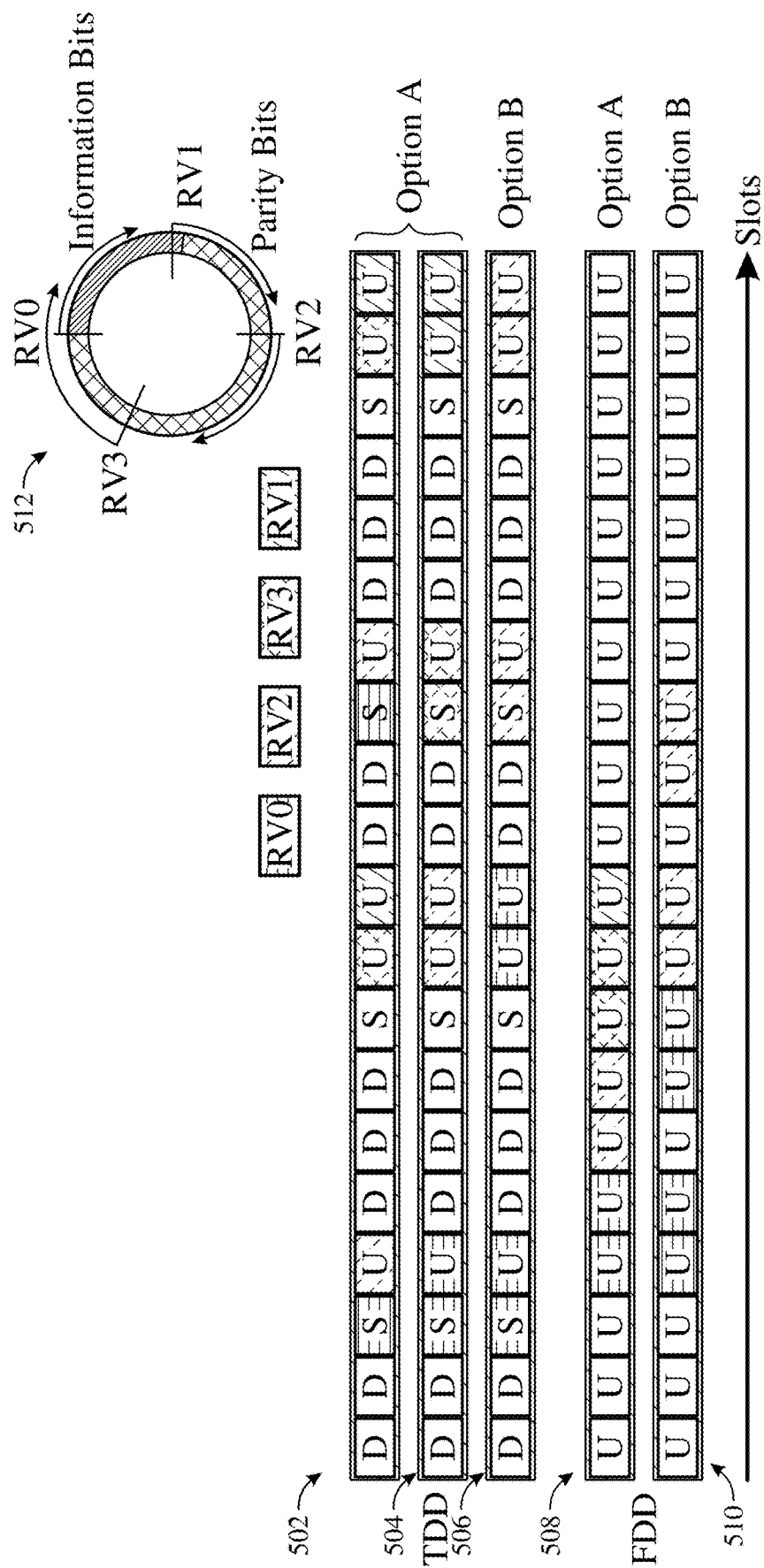
FIG. 5 is a diagram illustrating various cases for configuring redundancy versions, in accordance with certain aspects of the present disclosure.

FIG. 5 is a slot diagram illustrating various cases where Option A and Option B may be implemented in a TDD or frequency-division duplex (FDD) deployment, in accordance with certain aspects of the present disclosure. The RV sequence applied in these examples is RV0, RV2, RV3, and RV1 from the circular buffer 512. In case 502 of a TDD deployment, each RV is contained in a separate slot under Option A. In case 504 of a TDD deployment, each RV spans across two consecutive slots under Option A. In case 506 of a TDD deployment, a RV spans across non-consecutive slots under Option B. In case 508 of an FDD deployment, each RV spans across consecutive slots under Option A. In case 510 of an FDD deployment, a RV spans across non-consecutive slots under Option B.

Example Multi-TRP PUSCH Transmissions

In certain wireless communication systems (e.g., NR), a UE may support multi-connectivity with multiple transmission-reception points (multi-TRPs). In aspects, a TRP may refer to a wireless communication device in a wireless network, such as a base station and/or a remote radio head or antenna panel in communication with a base station. Multi-TRP communications may provide desirable reliability, coverage, and performance. Multi-TRP communications may enable a UE to communicate with spatially diverse TRPs via separate data layers providing desirable throughput and/or latency.

In certain cases, a UE may be scheduled to transmit data to separate TRPs with a set of transmission parameters associated with each of the TRPs. The transmission parameters may include a specific transmit beam, specific precoder, and/or specific uplink power control parameters. The specific transmit beam may be indicated by a spatial parameter for receive and/or transmit beamforming such as angle of arrival (AoA), AoA spread, dominant AoA, average AoA, Power Angular Spectrum (PAS) of AoA, angle of departure (AoD), AoD spread, average AoD, PAS of AoD, transmit/receive channel correlation, transmit/receive beamforming, spatial channel correlation, etc. In certain cases, the specific transmit beam may be indicated by a reference signal quasi-collocated (e.g., an SSB or CSI-RS) with a particular transmit beam. In other cases, the specific transmit beam may be indicated by a spatial domain transmission filter, a spatial relation, uplink transmission configuration indicator (TCI) state, and/or a transmission associated with a SRS resource set.

Figure 6:
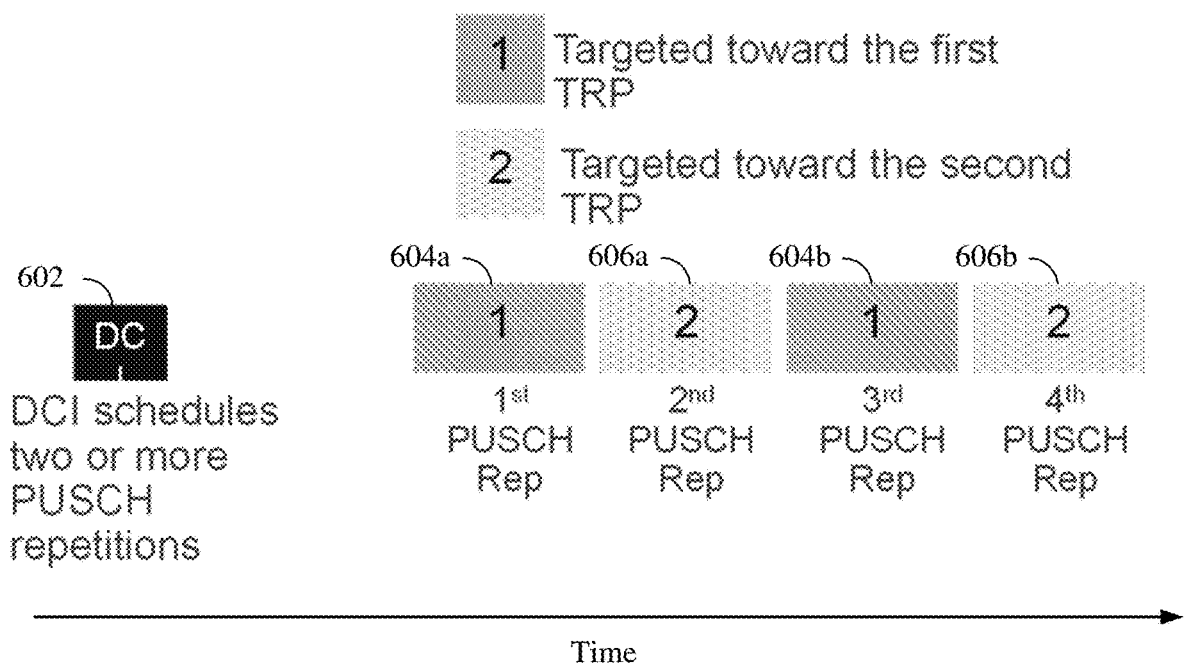
FIG. 6 is a timing diagram illustrating an example of uplink channel transmissions to multiple transmission reception points (TRPs), in accordance with certain aspects of the present disclosure.

FIG. 6 is a timing diagram illustrating an example of PUSCH transmissions to multiple TRPs, in accordance with certain aspects of the present disclosure. A UE may receive downlink control information (DCI) 602 scheduling two or more PUSCH repetitions for multiple TRPs. The DCI may be applicable for repetition Type-A and/or Type-B, codebook-based precoding with separate precoding matrixes and reference signal resource sets (e.g., a SRS resource set) for the TRPs, and/or non-codebook based precoding with separate reference signal resource sets for the TRPs. In this example, the UE may be scheduled to interleave the repetitions 604a, 604b for the first TRP with the repetitions 606a, 606b for the second TRP over separate transmission occasions in time.

Currently, multi-TRP communications only support single slot TB PUSCH transmissions in certain wireless communication systems (e.g., 5G NR). Single slot TB transmission provides undesirable flexibility in scheduling PUSCH transmissions and increases the signaling overhead, such as scheduling (e.g., DCI), cyclic redundancy check (CRC), and/or DMRS. Accordingly, what is needed are techniques and apparatus for implementing multi-slot TB transmissions for multi-TRP communications.

Example Multi-Slot Transmission Over PUSCH for Multi-TRP

Aspects of the present disclosure provide various techniques for implementing multi-slot TB transmissions over the PUSCH for multi-TRP communications. The techniques for implementing multi-slot TB transmissions among multiple TRPs may provide how to schedule the multi-slot TB transmissions, how the resources for the multi-slot TB transmissions may be multiplexed in the frequency domain and/or time domain, how resources may be allocated for the multi-slot TB transmissions, and/or how RVs and/or RV sequences may be configured for the multi-slot TB transmissions. In certain aspects, a multi-slot TB transmission in multi-TRP communications may provide desirable coverage, reliability, and/or performance, for example, due to the reduced overhead for the multi-slot TBs and spatial diversity provided by the multiple TRPs.

Figure 7:
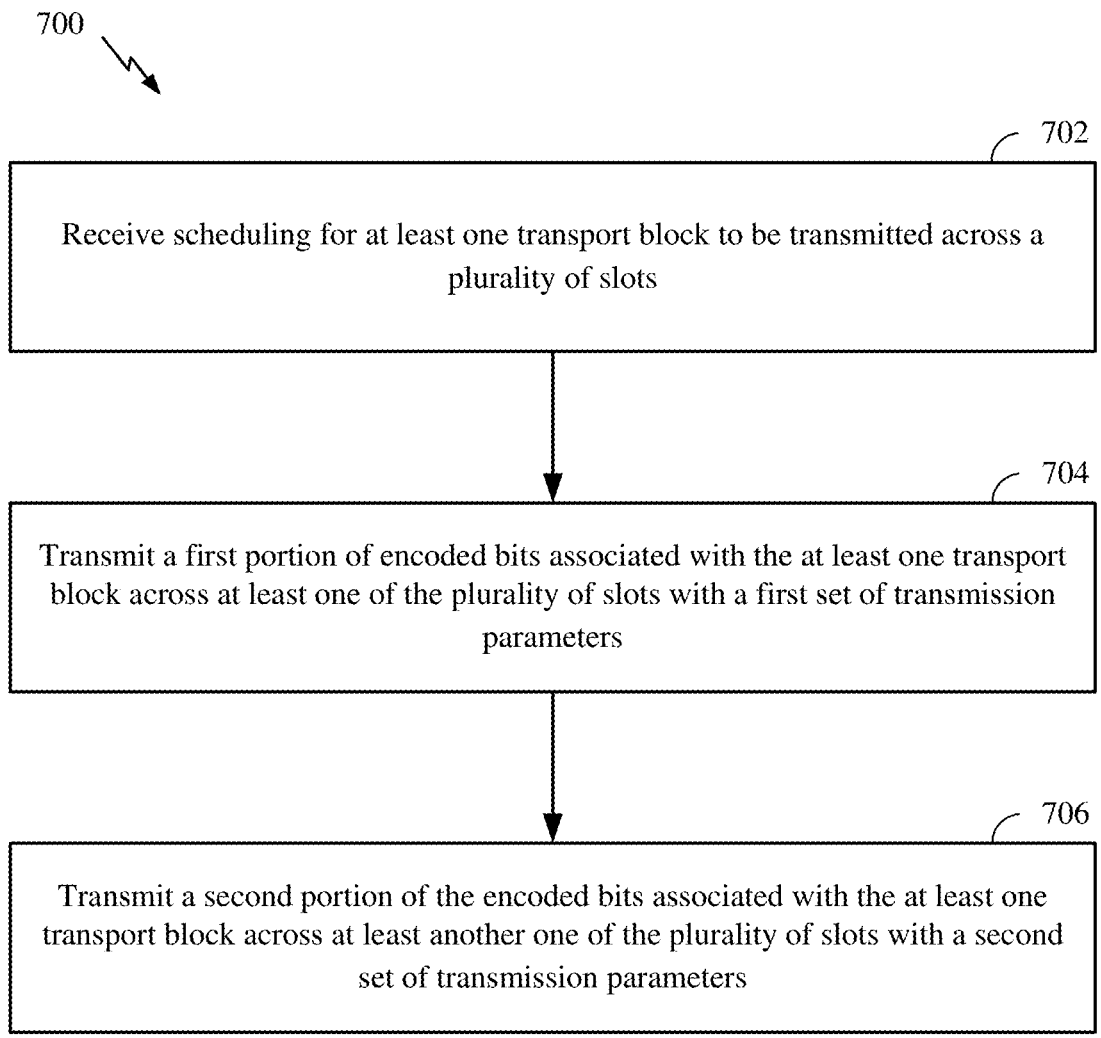
FIG. 7 is a flow diagram illustrating example operations for wireless communication by a UE, in accordance with certain aspects of the present disclosure.

FIG. 7 is a flow diagram illustrating example operations 700 for wireless communication, in accordance with certain aspects of the present disclosure. The operations 700 may be performed, for example, by a UE (such as the UE 120a in the wireless communication network 100). The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 702, where the UE may receive scheduling for at least one transport block to be transmitted across a plurality of slots. For example, the UE may receive, from a network entity, DCI that indicates the scheduling for the first portion of the transport block and the second portion of the transport block.

At block 704, the UE may transmit transmitting a first portion of encoded bits associated with the at least one transport block across at least one of the plurality of slots with a first set of transmission parameters. As described herein, the transmission parameters may be indicative of the beamforming, precoding, and/or transmit power used to communicate with the first TRP.

At block 706, the UE may transmit a second portion of the encoded bits associated with the at least one transport block across at least another one of the plurality of slots with a second set of transmission parameters. For example, the UE may transmit a multi-slot TB to a second TRP via the second set of transmission parameters.

Figure 9A:
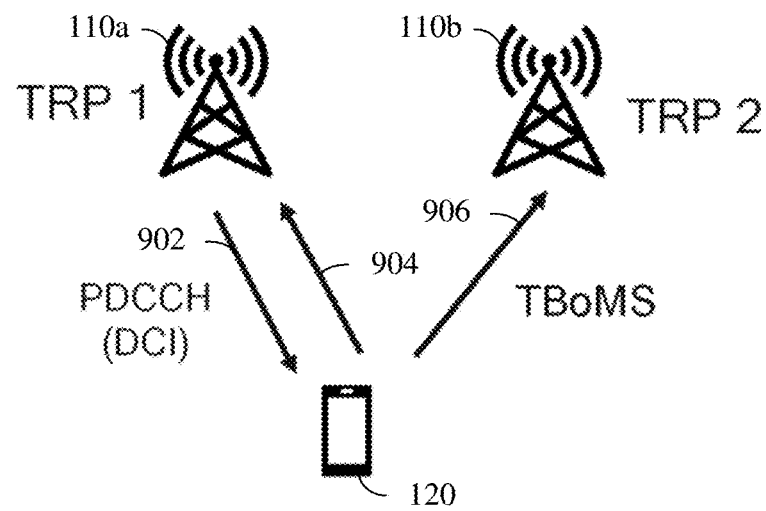
FIGS. 9A and 9B are diagrams illustrating examples of scheduling multi-slot transport block (TB) transmissions to TRPs, in accordance with certain aspects of the present disclosure.
Figure 9B:
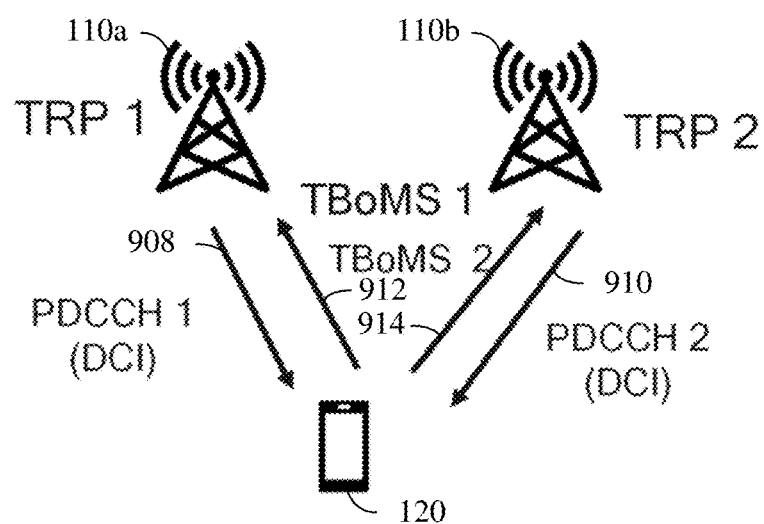

In certain aspects, the scheduling at block 702 may be indicated via a single DCI message from a single TRP and/or multiple DCI messages from separate TRPs as further described herein with respect to FIGS. 9A and 9B. With respect to the operations 700, the UE may receive a single downlink control message (e.g., a particular DCI format) indicating the scheduling for the first portion of the encoded bits associated with the at least one transport block and the second portion of the encoded bits associated with the at least one transport block. In certain cases, the UE may receive a first downlink control message indicating the scheduling for the first portion of the encoded bits via a first set of reception parameters. That is, the UE may receive the first downlink control message from a first TRP via the first set of reception parameters, which may provide the beamforming and/or precoding used to receive the control signaling from the first TRP. The UE may also receive a second downlink control message indicating the scheduling for the second portion of the encoded bits via a second set of reception parameters. That is, the UE may receive the second downlink control message from a second TRP via the second set of reception parameters, which may provide the beamforming and/or precoding used to receive the control signaling from the second TRP.

In certain aspects, the resources for the transport block(s) to the separate TRPs may be arranged sequentially or interleaved with each other. That is, the UE may map resources (e.g., frequency domain resources and/or time domain resources) across the first plurality of slots and the second plurality of slots for the first and second portions of the transport. With respect to the operations 700, the UE may map first resources for the first portion of the encoded bits associated with the at least one transport block across the plurality of slots, and the UE may map second resources for the second portion of the encoded bits associated with the at least one transport block across the plurality of slots. The first and second resources may include frequency domain resources (such as resource blocks) and/or time domain resources (e.g., symbols). At blocks 704 and 706, the UE may transmit the first portion of the encoded bits via the first resources and the second portion of the encoded bits via the second resources.

Figures 10, 11:
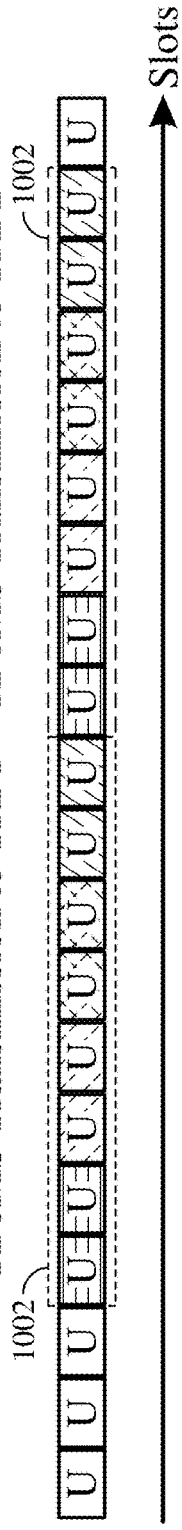
FIG. 10 is a slot diagram illustrating an example of mapping the resources of multi-slot TBs sequentially, in accordance with certain aspects of the present disclosure.
FIG. 11 is a slot diagram illustrating examples of interleaving the resources of the multi-slot TBs, in accordance with certain aspects of the present disclosure.

For certain aspects, the second resources may be arranged sequentially with the first resources, for example, as further described herein with respect to FIG. 10. As an example, the second resources may be arranged after the first resources in the time domain and/or in the frequency domain. In certain aspects, the second resources may be interleaved with the first resources in a sequence of resources (e.g., time domain resources and/or frequency domain resources), for example, as further described herein with respect to FIG. 11. As an example, segments of the second resources may be arranged between segments of the first resources in the sequence of resources.

In certain aspects, the resource allocation for TRPs may have the same or a different number of time domain resources and/or frequency domain resources. For example, the first portion of the encoded bits may be allocated the same number of frequency resources as the second portion of the encoded bits. In certain cases, the first portion of the encoded bits may be allocated a different number of frequency resources as the second portion of the encoded bits. A different number of time domain resources may be allocated to the first portion of the encoded bits as the second portion of the encoded bits.

With respect to the operations 700, the scheduling at block 702 may allocate first resources for the first portion of the encoded bits and second resources for the second portion of the encoded bits. The first resources may include a first number of time domain resources and a second number of frequency domain resources, and the second resources may include a third number of time domain resources and a fourth number of frequency domain resources. The UE may transmit the first portion of the encoded bits via the first resources and the second portion of the encoded bits via the second resources.

For certain aspects, the first number of time domain resources may be the same as the third number of time domain resources, and the second number of frequency domain resources and the same as the fourth number of frequency domain resources. In certain cases, the first number of time domain resources may be different from the third number of time domain resources, and the second number of frequency domain resources may be different from the fourth number of frequency domain resources. Those of skill in the art will understand that other combinations may be applied such as a different number of slots and the same number of resource blocks, or vice versa.

In certain aspects, the RV and/or RV sequence for the separate TRPs may be the same or different among the TRPs. As an example, the multi-slot TB scheduled to a first TRP may have a different RV and RV sequence as the multi-slot TB scheduled to a second TRP. In certain cases, the multi-slot TB scheduled to a first TRP may have a different RV and the same RV sequence as the multi-slot TB scheduled to a second TRP. For certain cases, the multi-slot TB scheduled to a first TRP may have the same RV and RV sequence as the multi-slot TB scheduled to a second TRP.

With respect to the operations 700, the scheduling at block 702 may indicate at least one redundancy version for the first portion of the encoded bits and the second portion of the encoded bits, and the redundancy version is associated with redundancy version sequence (e.g., {0, 2, 3, 1}, {0, 3, 0, 3}, or {0, 0, 0, 0}). For example, the redundancy version in the scheduling may indicate the starting RV within a particular RV sequence. The UE may transmit the first portion of the encoded bits and the second portion of the encoded bits based at least in part on the redundancy version and the redundancy version sequence. For example, the UE may transmit retransmissions for the first portion of the encoded bits using the RVs indicated in the RV sequence.

In certain cases, the redundancy version sequence indicated in the scheduling may include a first redundancy version sequence for the first portion of the encoded bits and a second redundancy version sequence for the second portion of the encoded bits. The first redundancy version sequence may be different from the second redundancy version sequence.

In certain aspects, a single RV may be used for both TRPs. With respect to the operations 700, the redundancy version indicated in the scheduling may include a single redundancy version for the first portion of the encoded bits and the second portion of the encoded bits.

For certain aspects, the scheduling at block 702 may indicate separate RVs for the TRPs. With respect to the operations 700, the redundancy version indicated in the scheduling may include a first redundancy version for the first portion of the encoded bits and a second redundancy version for the second portion of the encoded bits. The first redundancy version may be the same as the second redundancy version.

In certain aspects, the scheduling may explicitly indicate the first redundancy version, and the second redundancy version may be a next redundancy version from the first redundancy version in the at least one redundancy version sequence. For example, suppose the RV sequence for the TRPs is {0, 3, 0, 3}, and the scheduling indicates RV0 as the RV. The UE may interpret the explicit indication as being associated with a first TRP (e.g., the first portion of the encoded bits) and the next RV in the sequence (RV3) as being associated with a second TRP (e.g., the second portion of the encoded bits).

In aspects, the scheduling may explicitly indicate the first redundancy version, and the second redundancy version may be offset from the first redundancy version in the redundancy version sequence. For example, suppose the RV sequence for the TRPs is {0, 2, 3, 1}, and the scheduling indicates RV0 as the RV. The UE may interpret the explicit indication as being associated with a first TRP (e.g., the first portion of the encoded bits). The UE may be configured to interpret the RV for the second TRP as being offset by two elements in the sequence from the explicit indication, such that in this example, RV3 will be associated with the second TRP.

In aspects, the set of transmission parameters may be associated with a particular TRP. That is, the UE in the operations 700 may be configured to transmit the first portion of the encoded bits to a first TRP with the first set of transmission parameters and transmit the second portion of the encoded bits to a second TRP with the second set of transmission parameters. The first set of transmission parameters may include at least one of a first transmit beam, a first precoder, or a first uplink power control parameter. The second set of transmission parameters may include a second transmit beam, a second precoder, or a second uplink power control parameter. The transmit beams of the transmission parameters may refer to one or more spatial parameters associated with beamforming such as AoA, AoA spread, dominant AoA, average AoA, PAS of AoA, AoD, AoD spread, average AoD, PAS of AoD, transmit/receive channel correlation, transmit/receive beamforming, spatial channel correlation, etc. In certain cases, a spatial parameter may include a spatial domain transmission filter, a spatial relation, uplink TCI state, and/or a transmission associated with a SRS resource set. The UE may transmit the first portion of the encoded bits to a first TRP and transmit the second portion of the encoded bits to a second TRP with the respective set of transmission parameters.

In certain aspects, the transport block associated with the first and second portions of encoded bits may refer to a single transport block such that the first and second portions of encoded bits are separate segments of the single transport block. That is, a single transport block may include the first portion of the encoded bits and the second portion of the encoded bits, and the UE may transport portions of the single transport block to separate TRPs where the first portion of encoded bits is transmitted to a first TRP, and the second portion of the encoded bits is transmitted to a second TRP.

In certain aspects, the scheduling at block 702 may be for separate multi-slot TB transmissions to separate TRPs. The transport block associated with the first and second portions of the encoded bits may refer to separate transport blocks such that the first portion of the encoded bits is at least a segment of a first transport block and the second portion of the encoded bits is at least a segment of a second transport block. In other words, a first transport block may include the first portion of the encoded bits, and a second transport block may include the second portion of the encoded bits.

Figure 8:
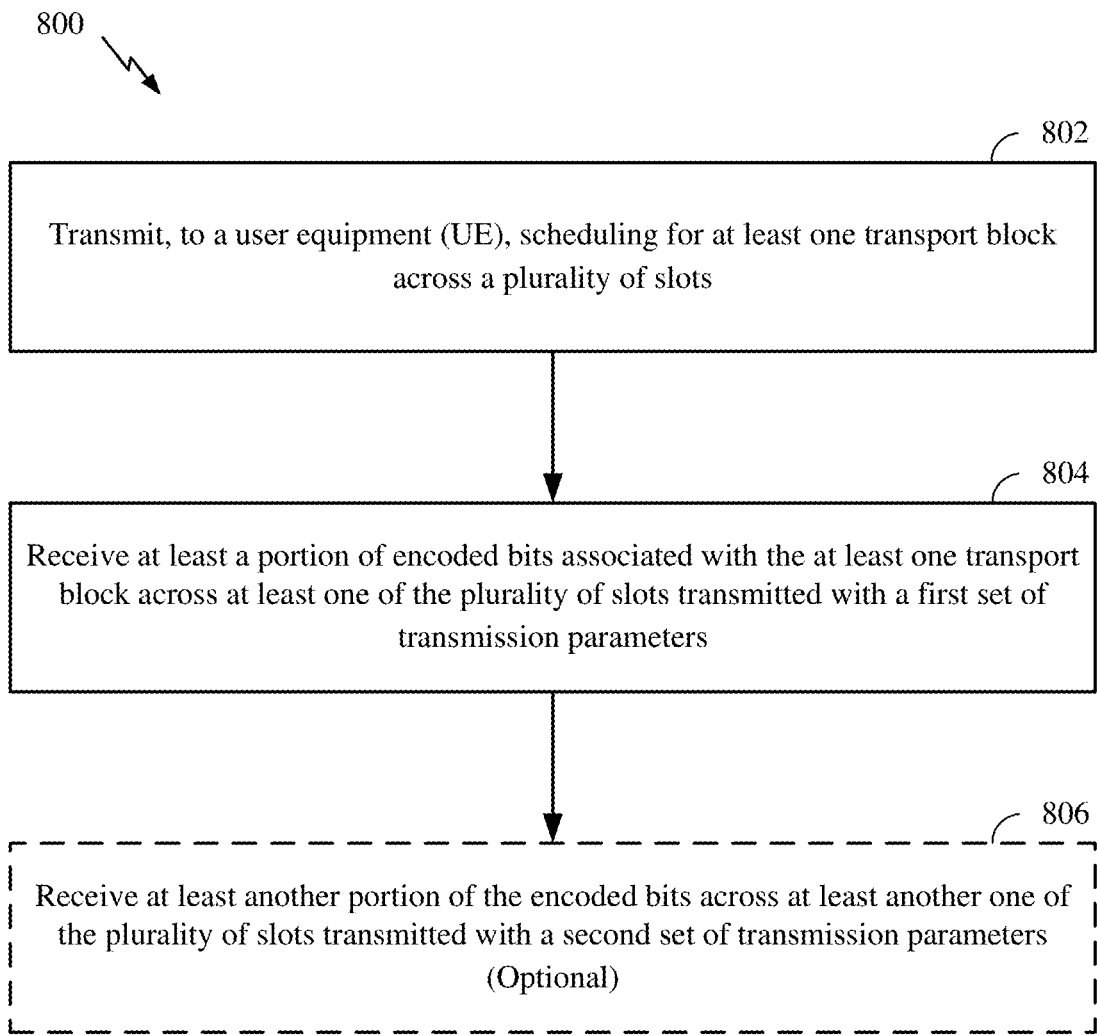
FIG. 8 is a flow diagram illustrating example operations for wireless communication by a network entity, in accordance with certain aspects of the present disclosure.

FIG. 8 is a flow diagram illustrating example operations 800 for wireless communication, in accordance with certain aspects of the present disclosure. The operations 800 may be performed, for example, by a network entity (such as the BS 110a in the wireless communication network 100). The operations 800 may be complementary to the operations 700 performed by the UE. The operations 800 may be implemented as software components that are executed and run on one or more processors (e.g., controller/processor 240 of FIG. 2). Further, the transmission and reception of signals by the network entity in operations 800 may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. As used herein, the network entity may refer to a wireless communication device in a radio access network, such as a base station, a remote radio head or antenna panel in communication with a base station, and/or network controller.

The operations 800 may begin, at block 802, where the network entity may transmit, to a UE (e.g., the UE 120), scheduling for at least one transport block across a plurality of slots. For example, the network entity may transmit the scheduling as DCI to the UE.

At block 804, the network entity may receive at least a portion of encoded bits associated with the at least one transport block across at least one of the plurality of slots transmitted with a first set of transmission parameters. For example, the network entity may receive the first portion of the transport block at a first TRP (such as a first remote radio head).

At block 806, the network entity may receive at least another portion of the encoded bits associated with the at least one transport block across at least another one of the plurality of slots transmitted with a second set of transmission parameters. For example, the network entity may receive the second portion of the encoded bits at a second TRP (such as a second remote radio head).

In aspects, the network entity may transmit the scheduling as a single DCI message or separate DCI messages from separate TRPs, for example, as described herein with respect to the operations 700. With respect to the operations 800, the network entity may transmit a single downlink control message (e.g., a particular DCI format) indicating the scheduling for a first portion of the encoded bits and a second portion of the encoded bits. In certain cases, the network entity may transmit a first downlink control message indicating the scheduling for the first portion of the encoded bits and transmit a second downlink control message indicating the scheduling for the second portion of the encoded bits. In aspects, the first downlink control message may be transmitted from a first TRP (e.g., BS 110*a* or a first remote radio head), and the second downlink control message may be transmitted from a second TRP (e.g., BS 110*b* or a second remote radio head).

For certain aspects, the resources for the transport block(s) received at the separate TRPs may be arranged sequentially or interleaved with each other, for example, as described herein with respect to the operations 700. The network entity may receive the first portion of the encoded bits via first resources and receiving the second portion of the encoded bits via second resources. In certain cases, the second resources may be arranged sequentially with the first resources. In certain aspects, the second resources may be interleaved with the first resources in a sequence of resources.

In certain aspects, the resource allocation for TRPs may have the same or a different number of time domain resources and/or frequency domain resources, for example, as described herein with respect to the operations 700. At block 802, the scheduling may allocate first resources for the first portion of the encoded bits and second resources for the second portion of the encoded bits. The first resources may include a first number of time domain resources and a second number of frequency domain resources, and the second resources includes a third number of time domain resources and a fourth number of frequency domain resources. The network entity may receive the first portion of the encoded bits via the first resources and the second portion of the encoded bits via the second resources. The first number of time domain resources may be the same as the third number of time domain resources, and the second number of frequency domain resources may be the same as the fourth number of frequency domain resources. In certain cases, the first number of time domain resources may be different from the third number of time domain resources, and the second number of frequency domain resources may be different from the fourth number of frequency domain resources.

In certain aspects, the RV and/or RV sequence for the separate TRPs may be the same or different among the TRPs, for example, as described herein with respect to the operations 700. At block 802, the scheduling may indicate at least one redundancy version for the first portion of the encoded bits and the second portion of the encoded bits, and the redundancy version may be associated with at least one redundancy version sequence. The network entity may receive the first portion of the encoded bits based at least in part on the redundancy version and the redundancy version sequence.

In aspects, the redundancy version sequence may include a first redundancy version sequence for the first portion of the encoded bits and a second redundancy version sequence for the second portion of the encoded bits, and the first redundancy version sequence may be different from the second redundancy version sequence.

In certain aspects, a single RV may be used for both TRPs. The redundancy version indicated in the scheduling may include a single redundancy version for the first portion of the encoded bits and the second portion of the encoded bits.

For certain aspects, the scheduling at block 802 may indicate separate RVs for the TRP, for example, as described herein with respect to the operations 700. The redundancy version may include a first redundancy version for the first portion of the encoded bits and a second redundancy version for the second portion of the encoded bits. The first redundancy version may be the same as the second redundancy version. In certain cases, the second redundancy version may be a next redundancy version or offset from the first redundancy version in the at least one redundancy version sequence.

In aspects, the set of transmission parameters may be associated with a particular TRP. That is, the network entity in the operations 800 may receive the first portion of the encoded bits at a first TRP and receive the second portion of the encoded bits at a second TRP. The set of transmission parameters may include a transmit beam, a precoder, and/or uplink power control parameters. The network entity may receive the first and second portions of the encoded bits using separate reception parameters, such as spatial reception parameters and/or a precoder. The network entity may receive the first portion of the encoded bits at a first TRP and receive the second portion of the encoded bits at a second TRP.

In aspects, the transport block associated with the first and second portions of the encoded bits may refer to a single transport block such that the first and second portions of the encoded bits are separate segments of the single transport block.

In certain aspects, the scheduling at block 802 may be for separate multi-slot TB transmissions to separate TRPs. That is, a first transport block may include the first portion of the encoded bits, and a second transport block may include the second portion of the encoded bits.

FIGS. 9A and 9B are diagrams illustrating examples of scheduling multi-slot TB transmissions to a first TRP 110*a* and a second TRP 110*b*, in accordance with certain aspects of the present disclosure. As shown in FIG. 9A, the first TRP 110*a* may transmit, to the UE 120, a single DCI message 902 that schedules separate multi-slot TB transmissions 904, 906 to the first TRP 110*a* and the second TRP 110*b*. Referring to FIG. 9B, the first and second TRPs 110*a*, 110*b* may transmit, to the UE 120, separate DCI messages 908, 910 that schedule multi-slot TB transmissions 912, 914 to the first TRP 110*a* and the second TRP 110*b*, respectively.

FIG. 10 is a slot diagram illustrating an example of mapping the resources of the multi-slot TBs sequentially, in accordance with certain aspects of the present disclosure. In this example, the time domain resources for the first multi-slot TB transmission 1002 to a first TRP may be arranged in slots before the time domain resources for the second multi-slot TB transmission 1004 to a second TRP.

FIG. 11 is a slot diagram illustrating examples of interleaving the resources of the multi-slot TBs, in accordance with certain aspects of the present disclosure. In the first interleaving case 1102, the time domain resources for the first multi-slot TB transmission 1108 to a first TRP are interleaved with the time domain resources for the second multi-slot TB transmission 1110 to a second TRP by every other slot in the sequence of slots. In the second interleaving case 1104, the time domain resources for the first multi-slot TB transmission 1108 to a first TRP are interleaved with the time domain resources for the second multi-slot TB transmission 1110 to a second TRP by every other pair of slots in the sequence of slots. In the third interleaving case 1106, the time domain resources for the first multi-slot TB transmission 1108 to a first TRP are interleaved with the time domain resources for the second multi-slot TB transmission 1110 to a second TRP by every other group of four slots in the sequence of slots. Separate RVs may be included in each of the slot groups according to the RV sequence {0, 2, 3, 1}, for example.

While the examples depicted in FIGS. 10 and 11 are described herein with respect to arranging time domain resources for the multi-slot TB transmissions for separate TRPs to facilitate understanding, aspects of the present disclosure may also be applied to arranging frequency domain resources sequentially and/or interleaved with each other.

Figure 12:
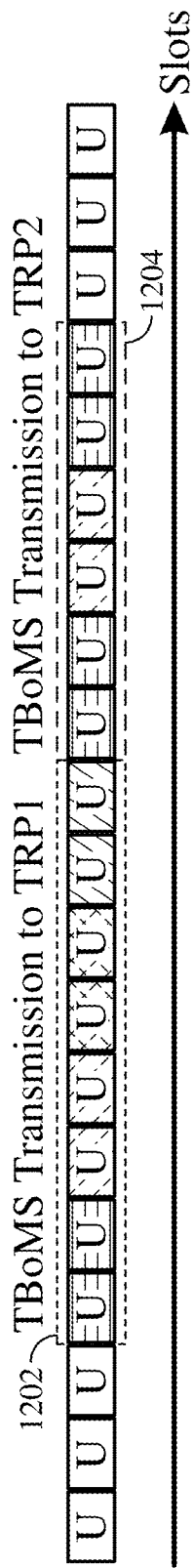
FIG. 12 is a slot diagram illustrating an example resource allocation for multi-slot TBs, in accordance with certain aspects of the present disclosure.

FIG. 12 is a slot diagram illustrating an example resource allocation for multi-slot TBs, in accordance with certain aspects of the present disclosure. In this example, the first multi-slot TB transmission 1202 to a first TRP may be scheduled in eight slots of time domain resources, and the second multi-slot TB transmission 1204 to a second TRP may be scheduled in six slots of time domain resources. While the example depicted in FIG. 12 is described herein with respect to allocating time domain resources for the multi-slot TB transmissions for separate TRPs to facilitate understanding, aspects of the present disclosure may also be applied to allocating the same or different number of frequency domain resources to the separate TRP transmissions.

Figure 13:
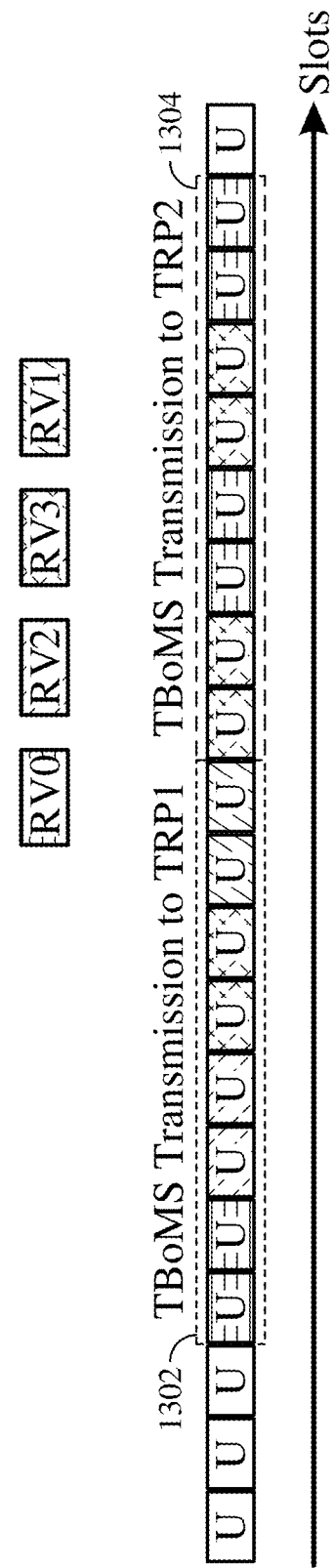
FIG. 13 is a slot diagram illustrating example redundancy version sequences for multi-slot TBs, in accordance with certain aspects of the present disclosure.

FIG. 13 is a slot diagram illustrating example RV sequences for multi-slot TBs, in accordance with certain aspects of the present disclosure. In this example, the first multi-slot TB transmission 1302 to a first TRP may be scheduled to start at RV0 in an RV sequence of {0, 2, 3, 1}, and the second multi-slot TB transmission 1304 to a second TRP may be scheduled to start at RV3 in an RV sequence of {0, 3, 0, 3}.

Figure 14:
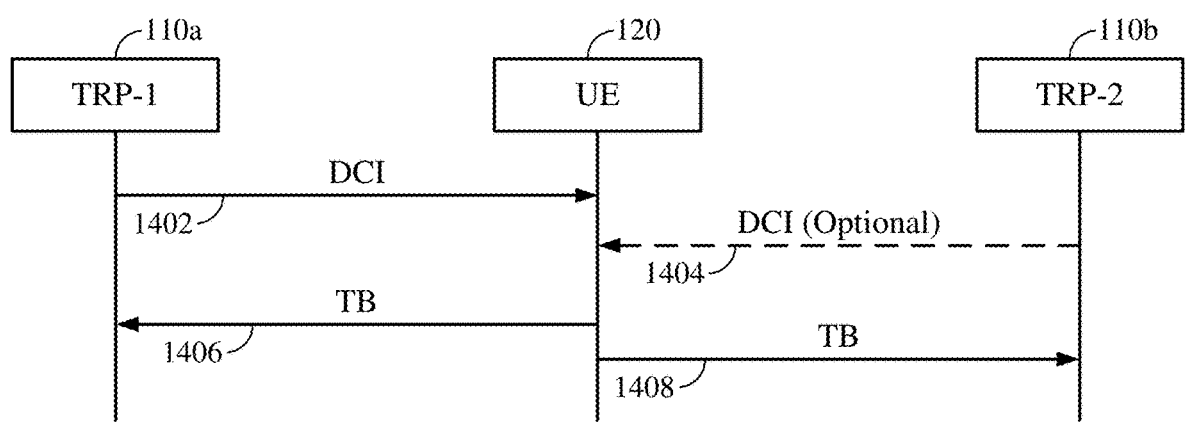
FIG. 14 is a signal flow diagram illustrating example signaling for multi-slot TBs to multiple TRPs, in accordance with certain aspects of the present disclosure.

FIG. 14 is a signal flow diagram illustrating example signaling for multi-slot TBs to a first TRP 110a and a second TRP 110b, in accordance with certain aspects of the present disclosure. At 1402, the first TRP 110a may transmit, to the UE 120, a DCI message with scheduling for at least one multi-slot TB transmission. In certain cases, the DCI at 1402 may include scheduling for a first multi-slot TB transmission to the first TRP 110a and for a second multi-slot TB transmission to the second TRP 110b. Optionally, at 1404, the second TRP 110b may transmit, to the UE 120, a DCI message with scheduling for the multi-slot TB transmission to the second TRP 110b. At 1406, the UE 120 may transmit a first multi-slot TB to the first TRP 110a with a first set of transmission parameters based on the scheduling, and at 1408, the UE 120 may transmit a second multi-slot TB to the second TRP 110b with a second set of transmission parameters based on the scheduling. In certain case, the multi-slot TB transmissions at 1406, 1408 may be mapped to sequential and/or interleaving resources as described herein. In certain aspects, the multi-slot TB transmissions at 1406, 1408 may be allocated the same or different number of resources as described herein. For certain aspects, the multi-slot TB transmissions at 1406, 1408 may be scheduled with the same or different RV and/or RV sequence as described herein. The multi-slot TB and multi-TRP communications described herein may enable the UE to have desirable coverage, reliability, and/or performance in the wireless communications with the TRPs 110a, 110b.

Figure 15:
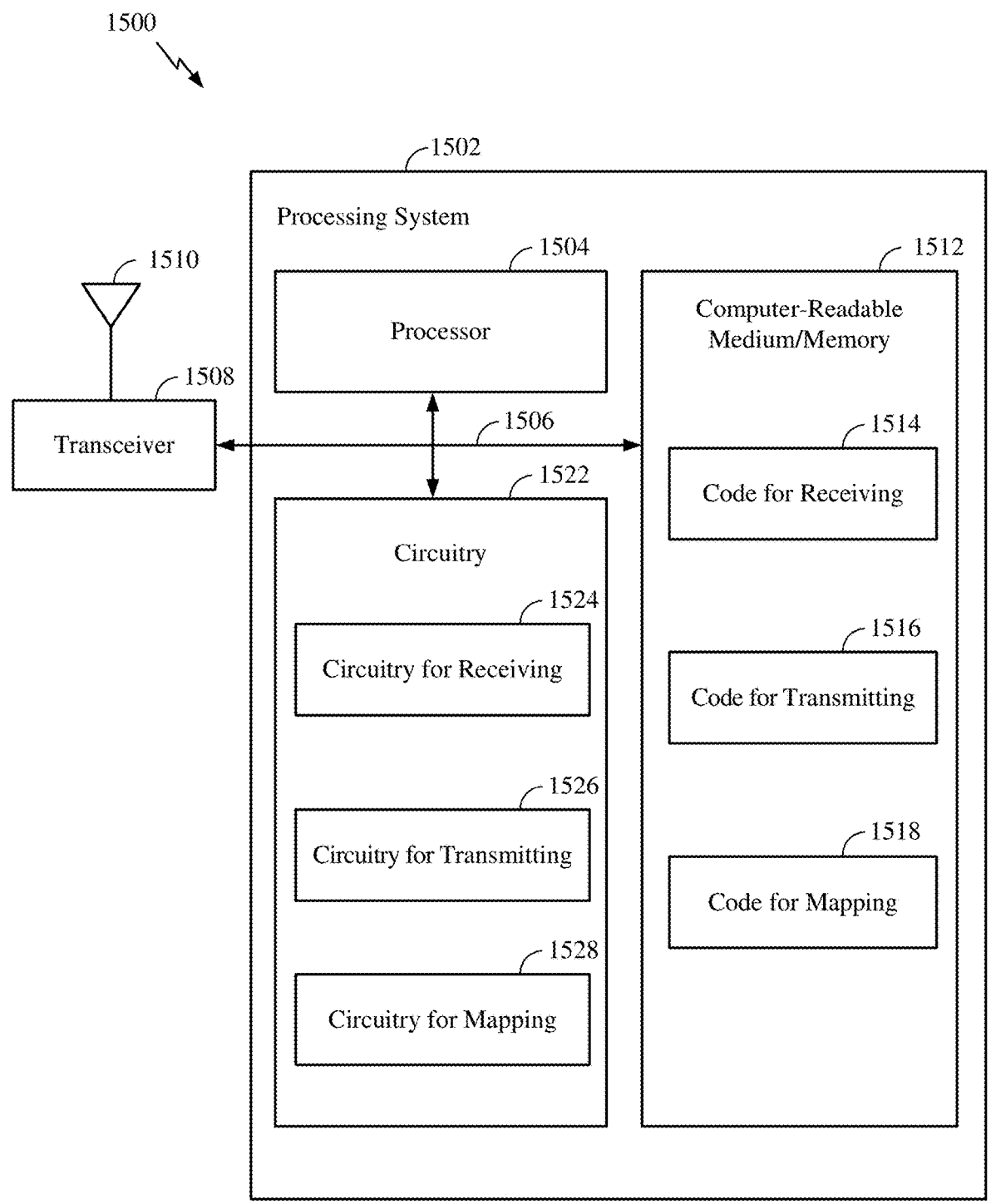
FIG. 15 illustrates a communications device (e.g., a UE) that may include various components configured to perform operations for the techniques disclosed herein in accordance with aspects of the present disclosure.

FIG. 15 illustrates a communications device 1500 (e.g., a UE) that may include various components (e.g., corresponding to means-plus-function components) configured to perform operations for the techniques disclosed herein, such as the operations illustrated in FIG. 7. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 7, or other operations for performing the various techniques discussed herein for implementing multi-slot TB transmissions to multiple TRPs. In certain aspects, computer-readable medium/memory 1512 stores code for receiving 1514, code for transmitting 1516, and/or code for mapping 1518. In certain aspects, the processing system 1502 has circuitry 1522 configured to implement the code stored in the computer-readable medium/memory 1512. In certain aspects, the circuitry 1522 is coupled to the processor 1504 and/or the computer-readable medium/memory 1512 via the bus 1506. For example, the circuitry 1522 includes circuitry for receiving 1524, circuitry for transmitting 1526, and/or circuitry for mapping 1528.

Figure 16:
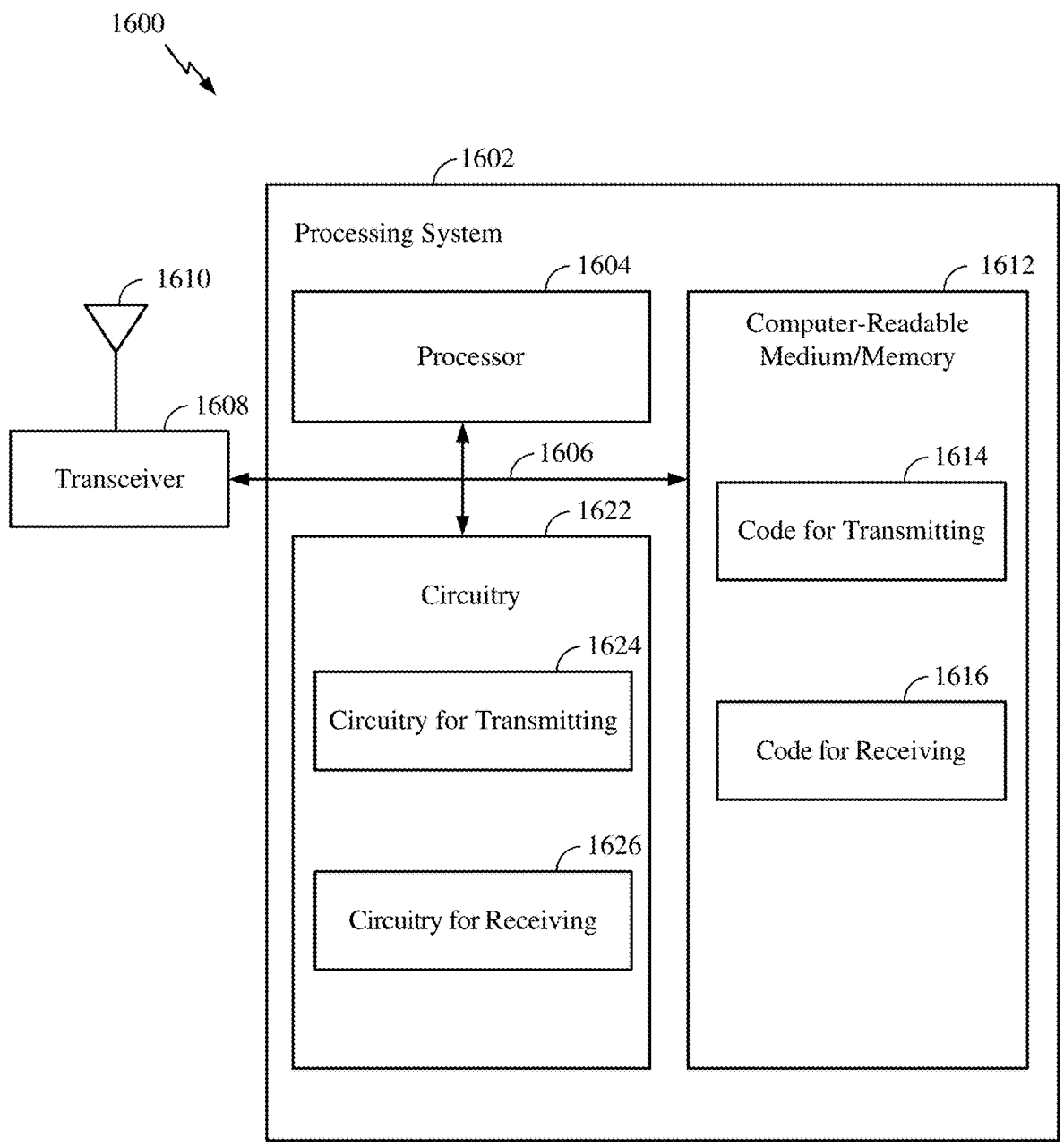
FIG. 16 illustrates a communications device (e.g., a BS) that may include various components configured to perform operations for the techniques disclosed herein in accordance with aspects of the present disclosure.

FIG. 16 illustrates a communications device 1600 (e.g., a BS) that may include various components (e.g., corresponding to means-plus-function components) configured to perform operations for the techniques disclosed herein, such as the operations illustrated in FIG. 8. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 8, or other operations for performing the various techniques discussed herein for implementing multi-slot TB transmissions to multiple TRPs. In certain aspects, computer-readable medium/memory 1612 stores code for transmitting 1614 and/or code for receiving 1616. In certain aspects, the processing system 1602 has circuitry 1622 configured to implement the code stored in the computer-readable medium/memory 1612. In certain aspects, the circuitry 1622 is coupled to the processor 1604 and/or the computer-readable medium/memory 1612 via the bus 1606. For example, the circuitry 1622 includes circuitry for transmitting 1624 and/or circuitry for receiving 1626.

Example Aspects

In addition to the various aspects described above, specific combinations of aspects are within the scope of the disclosure, some of which are detailed below:

Aspect 1. A method of wireless communication by a user equipment, comprising: receiving scheduling for at least one transport block to be transmitted across a plurality of slots; transmitting a first portion of encoded bits associated with the at least one transport block across at least one of the plurality of slots with a first set of transmission parameters; and transmitting a second portion of the encoded bits associated with the at least one transport block across at least another one of the plurality of slots with a second set of transmission parameters.

Aspect 2. The method of Aspect 1, wherein receiving the scheduling comprises receiving a single downlink control message indicating the scheduling for the first portion of the encoded bits associated with the at least one transport block and the second portion of the encoded bits associated with the at least one the transport block.

Aspect 3. The method of Aspect 1, wherein receiving the scheduling comprises: receiving a first downlink control message indicating the scheduling for the first portion of the encoded bits associated with the at least one transport block via a first set of reception parameters; and receiving a second downlink control message indicating the scheduling for the second portion of the encoded bits associated with the at least one transport block via a second set of reception parameters.

Aspect 4. The method according to any one of Aspects 1-3, wherein transmitting the first portion of the encoded bits associated with the at least one transport block and transmitting the second portion of the encoded bits associated with the at least one transport block comprises: mapping first resources for the first portion of the encoded bits across the at least one of the plurality of slots; mapping second resources for the second portion of the encoded bits across the at least other one of the plurality of slots; and transmitting the first portion of the encoded bits via the first resources and the second portion of the encoded bits via the second resources.

Aspect 5. The method of Aspect 4, wherein the second resources are arranged sequentially with the first resources.

Aspect 6. The method of Aspect 4, wherein the second resources are interleaved with the first resources in a sequence of resources.

Aspect 7. The method according to any one of Aspects 1-6, wherein: the scheduling allocates first resources for the first portion of the encoded bits and second resources for the encoded bits, the first resources includes a first number of time domain resources and a second number of frequency domain resources, and the second resources includes a third number of time domain resources and a fourth number of frequency domain resources; and transmitting the first portion of the encoded bits and transmitting the second portion of the encoded bits comprises transmitting the first portion of encoded bits via the first resources and the second portion of the encoded bits via the second resources.

Aspect 8. The method of Aspect 7, wherein: the first number of time domain resources is the same as the third number of time domain resources; and the second number of frequency domain resources is the same as the fourth number of frequency domain resources.

Aspect 9. The method of Aspect 7, wherein: the first number of time domain resources is different from the third number of time domain resources; and the second number of frequency domain resources is different from the fourth number of frequency domain resources.

Aspect 10. The method according to any one of Aspects 1-9, wherein: the scheduling indicates at least one redundancy version for the first portion of the encoded bits and the second portion of the encoded bits, and the at least one redundancy version is associated with at least one redundancy version sequence; and transmitting the first portion of the encoded bits and the second portion of the encoded bits comprises transmitting the first portion of the encoded bits and the second portion of the encoded bits based at least in part on the at least one redundancy version and the at least one redundancy version sequence.

Aspect 11. The method of Aspect 10, wherein: the at least one redundancy version sequence comprises a first redundancy version sequence for the first portion of the encoded bits and a second redundancy version sequence for the second portion of the encoded bits; and the first redundancy version sequence is different from the second redundancy version sequence.

Aspect 12. The method of Aspect 10, wherein the at least one redundancy version includes a single redundancy version for the first portion of the encoded bits and the second portion of the encoded bits.

Aspect 13. The method of Aspect 10, wherein the at least one redundancy version includes a first redundancy version for the first portion of the encoded bits and a second redundancy version for the second portion of the encoded bits.

Aspect 14. The method of Aspect 13, wherein the first redundancy version is the same as the second redundancy version.

Aspect 15. The method of Aspect 13, wherein: the scheduling explicitly indicates the first redundancy version; and the second redundancy version is a next redundancy version from the first redundancy version in the at least one redundancy version sequence.

Aspect 16. The method of Aspect 13, wherein: the scheduling explicitly indicates the first redundancy version; and the second redundancy version is offset from the first redundancy version in the at least one redundancy version sequence.

Aspect 17. The method according to any one of Aspects 1-16, wherein: the first set of transmission parameters includes at least one of a first transmit beam, a first precoder, or a first uplink power control parameter; and the second set of transmission parameters includes a second transmit beam, a second precoder, or a second uplink power control parameter.

Aspect 18. The method according to any one of Aspects 1-17, wherein: transmitting the first portion of the encoded bits comprises transmitting the first portion of the encoded bits to a first transmission-reception point (TRP); and transmitting the second portion of the encoded bits comprises transmitting the second portion of the encoded bits to a second TRP.

Aspect 19. The method according to any one of Aspects 1-18, wherein a single transport block includes the first portion of the encoded bits and the second portion of the encoded bits.

Aspect 20. The method according to any one of Aspects 1-19, wherein a first transport block includes the first portion of the encoded bits, and a second transport block includes the second portion of the encoded bits.

Aspect 21. A method of wireless communication by a network entity, comprising: transmitting, to a user equipment (UE), scheduling for at least one transport block across a plurality of slots; and receiving at least a portion of encoded bits associated with the at least one transport block across at least one of the plurality of slots transmitted with a first set of transmission parameters.

Aspect 22. The method of Aspect 21, wherein transmitting the scheduling comprises transmitting a single downlink control message indicating the scheduling for a first portion of the encoded bits and a second portion of the encoded bits associated with the at least one transport block.

Aspect 23. The method according to any one of Aspects 21 or 22, further comprising: receiving a second portion of the encoded bits across at least another one of the plurality of slots transmitted with a second set of transmission parameters; and wherein receiving the portion of the encoded bits comprises receiving a first portion of the encoded bits via first resources and receiving a second portion of the encoded bits via second resources.

Aspect 24. The method of Aspect 23, wherein the second resources are arranged sequentially with the first resources.

Aspect 25. The method of Aspect 23, wherein the second resources are interleaved with the first resources in a sequence of resources.

Aspect 26. The method according to any one of Aspects 21-25, wherein: the scheduling allocates first resources for a first portion of the encoded bits and second resources for a second portion of the encoded bits, the first resources includes a first number of time domain resources and a second number of frequency domain resources, and the second resources includes a third number of time domain resources and a fourth number of frequency domain resources; and wherein receiving at least the portion of the encoded bits comprises receiving a first portion of the encoded bits via the first resources and a second portion of the encoded bits via the second resources.

Aspect 27. The method according to any one of Aspects 21-26, wherein: the scheduling indicates at least one redundancy version for a first portion of the encoded bits and a second portion of the encoded bits, and the at least one redundancy version is associated with at least one redundancy version sequence; and receiving at least the portion of the encoded bits comprises receiving a first portion of the encoded bits based at least in part on the at least one redundancy version and the at least one redundancy version sequence.

Aspect 28. The method according to any one of Aspects 21-27, wherein: receiving at least the portion of the encoded bits comprises receiving a second portion of the encoded bits across at least one of the plurality of slots transmitted with a second set of transmission parameters; the first set of transmission parameters includes at least one of a first transmit beam, a first precoder, or a first uplink power control parameter; and the second set of transmission parameters includes a second transmit beam, a second precoder, or a second uplink power control parameter.

Aspect 29. An apparatus for wireless communication, comprising: a transceiver configured to: receive scheduling for at least one transport block to be transmitted across a plurality of slots; transmit a first portion of encoded bits associated with the at least one transport block across at least one of the plurality of slots with a first set of transmission parameters; and transmit a second portion of the encoded bits associated with the at least one transport block across at least another one of the plurality of slots with a second set of transmission parameters.

Aspect 30. An apparatus for wireless communication, comprising: a transceiver configured to: transmit, to a user equipment (UE), scheduling for at least one transport block across a plurality of slots; and receive at least a portion of encoded bits associated with the at least one transport block across at least one of the plurality of slots transmitted with a first set of transmission parameters.

Aspect 31. An apparatus, comprising: a memory comprising computer-executable instructions; one or more processors configured to execute the computer-executable instructions and cause the processing system to perform a method in accordance with any one of Aspects 1-28.

Aspect 32. An apparatus, comprising means for performing a method in accordance with any one of Aspects 1-28.

Aspect 33. A non-transitory computer-readable medium comprising computer-executable instructions that, when executed by one or more processors of a processing system, cause the processing system to perform a method in accordance with any one of Aspects 1-28.

Aspect 34. A computer program product embodied on a computer-readable storage medium comprising code for performing a method in accordance with any one of Aspects 1-28.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication, comprising:
a transceiver configured to:
receive scheduling for at least one transport block to be transmitted across a plurality of slots;
transmit, based at least in part on a first redundancy version associated with at least one redundancy version sequence, a first portion of encoded bits associated with the at least one transport block across at least a first slot of the plurality of slots with a first set of transmission parameters; and
transmit, based at least in part on a second redundancy version associated with the at least one redundancy version sequence, a second portion of the encoded bits associated with the at least one transport block across at least a second slot of the plurality of slots with a second set of transmission parameters,
wherein the scheduling indicates the first redundancy version for the first portion of the encoded bits and the second redundancy version for the second portion of the encoded bits.

2. The apparatus of claim 1, wherein, to receive the scheduling, the transceiver is configured to receive a single downlink control message indicating the scheduling.

3. The apparatus of claim 1, wherein, to receive the scheduling, the transceiver is configured to:
receive a first downlink control message indicating the scheduling for the first portion of the encoded bits associated with the at least one transport block via a first set of reception parameters; and
receive a second downlink control message indicating the scheduling for the second portion of the encoded bits associated with the at least one transport block via a second set of reception parameters.

4. The apparatus of claim 1, wherein:
the at least one redundancy version sequence comprises a first redundancy version sequence for the first portion of the encoded bits and a second redundancy version sequence for the second portion of the encoded bits; and
the first redundancy version sequence is different from the second redundancy version sequence.

5. The apparatus of claim 1, wherein the first redundancy version is the same as the second redundancy version.

6. The apparatus of claim 1, wherein:
the scheduling explicitly indicates the first redundancy version; and
the second redundancy version is a next redundancy version from the first redundancy version in the at least one redundancy version sequence.

7. The apparatus of claim 1, wherein:
the scheduling explicitly indicates the first redundancy version; and
the second redundancy version is offset from the first redundancy version in the at least one redundancy version sequence.

8. The apparatus of claim 1, wherein, to transmit the first portion of the encoded bits, the transceiver is configured to transmit the first portion of the encoded bits to a first transmission-reception point (TRP); and wherein, to transmit the second portion of the encoded bits, the transceiver is configured to transmit the second portion of the encoded bits to a second TRP.

9. The apparatus of claim 1, wherein a single transport block includes the first portion of the encoded bits and the second portion of the encoded bits.

10. The apparatus of claim 1, wherein a first transport block includes the first portion of the encoded bits, and a second transport block includes the second portion of the encoded bits.

11. The apparatus of claim 1, wherein:
the first set of transmission parameters includes at least one of a first transmit beam parameter, a first precoder parameter, or a first uplink power control parameter; and
the second set of transmission parameters includes at least one of a second transmit beam parameter, a second precoder parameter, or a second uplink power control parameter.

12. An apparatus for wireless communication, comprising:
a transceiver configured to:
transmit scheduling for at least one transport block across a plurality of slots;
receive, based at least in part on at least one redundancy version and at least one redundancy version sequence, a first portion of encoded bits associated with the at least one transport block across at least one slot of the plurality of slots transmitted with a first set of transmission parameters, wherein the first set of transmission parameters includes at least one of a first transmit beam parameter, a first precoder parameter, or a first uplink power control parameter; and
receive a second portion of the encoded bits associated with the at least one transport block across at least another one slot of the plurality of slots with a second set of transmission parameters, wherein the second set of transmission parameters includes at least one of a second transmit beam parameter, a second precoder parameter, or a second uplink power control parameter, wherein the scheduling indicates the at least one redundancy version for the first portion of the encoded bits and the second portion of the encoded bits, and wherein the at least one redundancy version is associated with the at least one redundancy version sequence.

13. The apparatus of claim 12, wherein, to transmit the scheduling, the transceiver is configured to transmit a single downlink control message indicating the scheduling.

14. A method of wireless communication performed by an apparatus, the method comprising:
receiving scheduling for at least one transport block to be transmitted across a plurality of slots;
transmitting, based at least in part on a first redundancy version associated with at least one redundancy version sequence, a first portion of encoded bits associated with the at least one transport block across at least one slot of the plurality of slots with a first set of transmission parameters; and
transmitting, based at least in part on a second redundancy version associated with the at least one redundancy version sequence, a second portion of the encoded bits associated with the at least one transport block across at least another one slot of the plurality of slots with a second set of transmission parameters,
wherein the scheduling indicates the first redundancy version for the first portion of the encoded bits and the second redundancy version for the second portion of the encoded bits.

15. The method of claim 14, wherein the first redundancy version is the same as the second redundancy version.

16. The method of claim 14, wherein:
the scheduling explicitly indicates the first redundancy version; and
the second redundancy version is a next redundancy version from the first redundancy version in the at least one redundancy version sequence.

17. The method of claim 14, wherein:
the scheduling explicitly indicates the first redundancy version; and
the second redundancy version is offset from the first redundancy version in the at least one redundancy version sequence.

18. A method of wireless communication performed by an apparatus, the method comprising:
transmitting scheduling for at least one transport block across a plurality of slots;
receiving, based at least in part on at least one redundancy version and at least one redundancy version sequence, a first portion of encoded bits associated with the at least one transport block across at least one slot of the plurality of slots transmitted with a first set of transmission parameters, wherein the first set of transmission parameters includes at least one of a first transmit beam parameter, a first precoder parameter, or a first uplink power control parameter; and receiving a second portion of the encoded bits associated with the at least one transport block across at least another one slot of the plurality of slots with a second set of transmission parameters, wherein the second set of transmission parameters includes at least one of a second transmit beam parameter, a second precoder parameter, or a second uplink power control parameter, wherein the scheduling indicates the at least one redundancy version for the first portion of the encoded bits and the second portion of the encoded bits, and wherein the at least one redundancy version is associated with the at least one redundancy version sequence.

* * * * *